March 5, 1968  R. L. BUTLER  3,371,775
PACKAGE FOR ELONGATE OBJECTS AND METHOD OF
PACKAGING ELONGATE OBJECTS
Filed Aug. 2, 1965
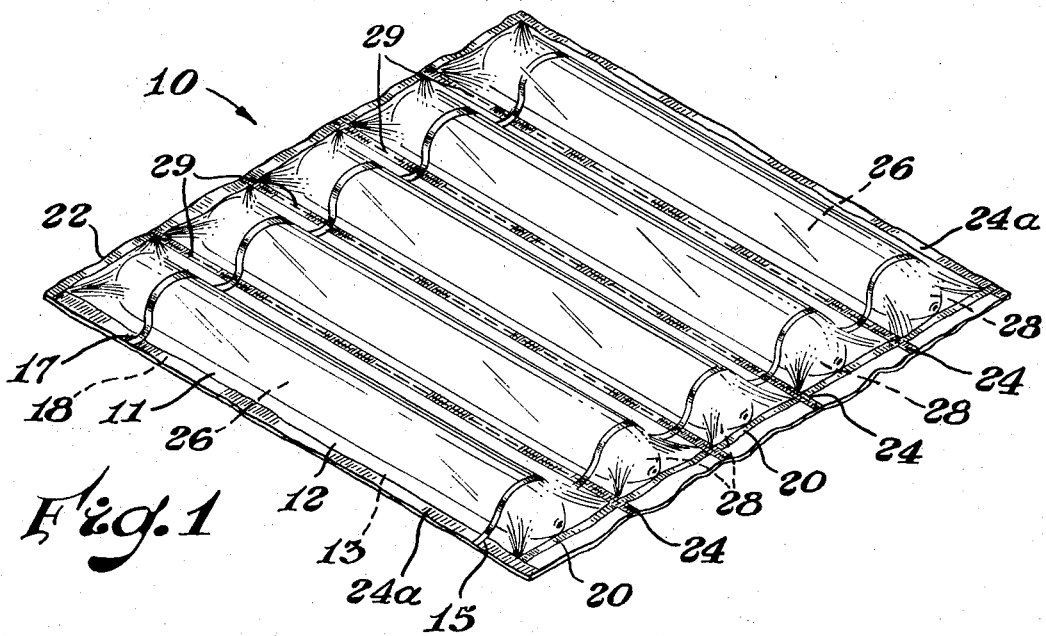
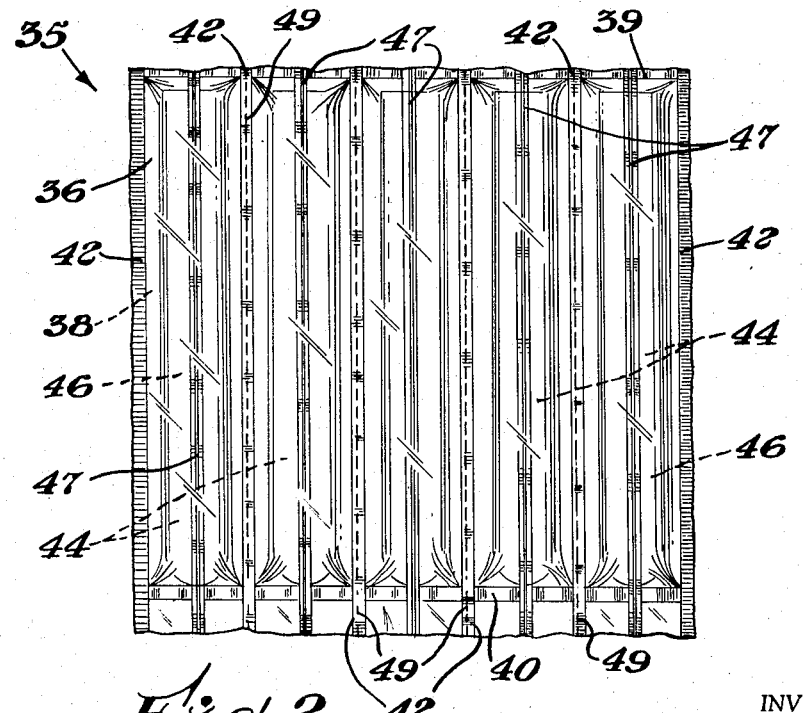
INVENTOR.
Russell L. Butler
BY Robert Ingraham
AGENT

United States Patent Office 3,371,775
Patented Mar. 5, 1968

3,371,775
PACKAGE FOR ELONGATE OBJECTS AND METHOD OF PACKAGING ELONGATE OBJECTS
Russell L. Butler, Midland, Mich., assignor to The Dow Chemical Company, Midland, Mich., a corporation of Delaware
Filed Aug. 2, 1965, Ser. No. 476,486
13 Claims. (Cl. 206—56)

ABSTRACT OF THE DISCLOSURE

An improved cigar package is prepared from a three layer film having polyethylene on the outer surfaces and a central layer of Saran. Cigars are hermetically sealed in individual packets.

---

This invention relates to the packaging of elongate objects and more particularly relates to a method of packaging such elongate objects in readily openable synthetic resinous containers.

Oftentimes, it is desirable to package elongate objects in individual compartments in an attractive package which can be readily handled and is hermetically sealed. Elongate objects such as cigars which are sensitive to moisture and the loss of moisture have been packaged in a wide variety of wraps and containers.

It would be beneficial if there were available a method and package for elongate objects such as cigars which would permit the hermetic sealing of individual cigars and provide protection against drying.

It would be further advantageous if such package could be quickly and readily prepared.

It would be beneficial if a single unit would contain a number of packages, each package containing an elongate object or cigar wherein each compartment could be readily opened in sequence and the contents removed without disturbing the hermetic seal of the remaining containers.

These benefits and other advantages in accordance with the present invention are achieved in an improved package for elongate objects comprising a first panel and a second panel of a synthetic resinous material, the first panel and the second panel being bonded together in face to face arrangement at selected portions to provide a plurality of hermetically sealed compartments, an elongate object disposed within at least one of the hermetically sealed compartments, the first and second panels being of a layered construction and having an inner layer of a halogenated plastic and outer layers of a resinous polyolefin such as polyethylene, polypropylene and resinous copolymers thereof.

The method in accordance with the present invention comprises enclosing a plurality of elongate objects within a synthetic resinous thermoplastic material in the form of a film or sheet wherein each elongate object is disposed in a separate compartment formed by the sealing of the film or sheet to a generally like film or sheet wherein the film or sheet inner layer is a halogenated hydrocarbon resin, and the outer layers are of a polyolefin resin such as polyethylene, polypropylene and resinous copolymers thereof.

Packages in accordance with the present invention are readily prepared utilizing a variety of synthetic resinous materials. However, it is essential and critical that the material from which the package in accordance with the present invention is formed be synthetic resinous film or sheet having a thickness of from about 1.2 mils to about 8 mils and preferably having a thickness of from about 2 to about 6 mils. When the material from which the package is formed is thinner than about 1.2 mils, it has a relatively undesirable hand and does not offer sufficient mechanical protection or desirable stiffness to protect the contents such as cigars or the like. When the thickness of the film exceeds about 8 mils, it becomes too stiff for convenient handling.

Beneficially, films having a thickness of from about 2 to about 6 mils are preferred wherein the resultant package is neither too stiff nor too limp and provides adequate mechanical protection for the material therein. Advantageously, the film or sheet utilized in preparing the packages comprises at least three layers of synthetic resinous thermoplastic material and beneficially, each of the layers is transparent to afford ready inspection of the product contained therein without the necessity of breaking the hermetic seal. The inner or control layer of the film is beneficially formed from an oxygen and moisture vapor barrier resin such as halogenated hydrocarbon resins such as polymers of vinylidene chloride containing minor proportions of other monomers copolymerizable therewith.

By the term "polyolefin" is meant polyethylene, polypropylene resinous copolymers of ethylene and propylene, copolymers of ethylene and/or propylene with minor proportions of olefinically unsaturated monomers such as, for example, those alpha-olefins having from 2 to 8 carbon atoms such as 1-butene, 1-pentene, 1-hexene, 1-heptene, 1-octene and mixed higher alpha-olefins. Other hydrocarbons useful for making copolymers with ethylene and propylene include with ethylene and propylene include divinylbenzene, allene, dimethallyl, and isopentene. Comonomers which can broadly be used include monosubstituted ethylenes such as 1-pentene, vinylcyclohexene, allyl benzene, $C_8$–$C_{14}$ mixed with alpha-olefins, styrene, allyl naphthalene, and the like, 1,1-disubstituted ethylenes such as alpha-methyl styrene, 2-methylbutene-1, mixed alpha- and beta-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,3, 1,2-dihydrobenzene, allo-ocimene, and cyclopentadiene, unconjugated dienes such as mixed octadienes, hexadiene-1,5, 2,5-dimethylhexadiene-1,5, 1,4-dihydrobenzene, bicycloheptadiene, bicyclopentadiene, 4-vinylcyclohexene-1, and 4,7-diphenyl decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile, and mixtures and blends thereof.

A wide variety of barrier materials may be employed in the central layer of films in accordance with the present invention. Particularly suited as barrier layers are combinations of vinylidene-chloride polymers, vinyl-chloride polymers, vinylidene-fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene-chloride polymers, wherein the polymers contain at least about 70 weight percent vinylidene-chloride, the remainder being one or more olefinically unsaturated monomers copolymerizable therewith. Suitable vinylidene-chloride copolymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene chloride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or Saran combinations are acetyl tributyl citrate, epoxidized soyabean oil (commercially available under the trade designation of Paraplex G–60) and dibutyl sebacate.

Beneficially, in certain instances, it is desirable to add adhesive or bonding layers between the barrier layer and the outer polyolefin layer. The nature of such bonding or adhesive layers must be such that the adhesion between the outer and inner layer is increased as increased seal strength and resistance to delamination are to be obtained.

Many polymers may be employed for the purpose and coextruded simultaneously as the film is formed to provide five-layer film, wherein the outer layers are of a polyolefin layer, such as polyethylene, polypropylene and the resinous copolymers of ethylene and propylene.

Beneficially, the adhesive layer will vary in thickness from about 0.05 to about 0.8 mil; however, generally the preferred range of adhesive layer thickness is from about 0.1 to about 0.3 mil in thickness. Oftentimes the strength of the bond between the inner or core layer and the outer or surface layer increases slowly as the thickness of the adhesive layer is increased, and generally little or no increase in the bond strengths occurs after the thickness of the bonding layer has reached 0.5 to 0.6.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion. The bond strength of the resultant two-layer laminate is readily determined by conventional peel strength tests. Similarly, the adhesive layer composition is evaluated by a similar extrusion utilizing the polyolefin material.

Of great help in selecting the proper adhesive layer material are the solubility parameters or $\delta$ values. Solubility parameters or $\delta$ values are discussed in "Some Factors Affecting the Solubility of Polymers" by P. A. Small, Journal of Applied Chemicstry, 3, 71 (1963) and also by Harry Burrell in the "Chemical Review," 14, 3–16, 31–46 (1955). For example, some $\delta$ values of typical polymers are polytetrafluoroethylene 6.2; polypropylene 7.2; polyethylene 7.9; butadiene/styrene 8.1; polystyrene 9.1; polyethyl acrylate 9.2; chlorinated polyethylene (35 weight percent chlorine) 9.3; polyvinylacetate 9.4; polyvinyl chloride 9.7; 76 percent styrene and 24 percent acrylonitrile 10.1; chlorostyrene 10.5; 85 percent vinylidene chloride and 15 percent vinyl chloride 12.2; and polyacrylonitrile 15.4. Generally, adhesion is obtained when a polymer is selected having $\delta$ values which are within about 3 units each of the materials to be adhered. For example, polyethylene and the vinylidene chloride polymer are readily adhered by copolymers having $\delta$ values between 9.2 and about 10.1. In the instance of adhering layers of polyolefins such as polyethylene and polypropylene to vinylidene chloride polymers, polymers which are particularly advantageous are copolymers from about 13 weight percent to about 35 weight percent vinyl acetate with from about 87 weight percent to about 65 weight percent ethylene, copolymers of from about 20 to 30 weight percent ethylacrylate with from about 80 to 70 weight percent ethylene, copolymers from about 20 to 30 weight percent isobutyl acrylate with from about 80 to 70 weight percent of ethylene, chlorinated polyethylene containing from about 25 to 40 weight percent chlorine and polyvinyl chloride.

Composite film, for the practice of the present invention, is readily prepared by heat-plastifying a core-forming polymer and heat-plastifying a polyolefin material, such as employed in the outer layers, i.e. while in the heat-plastified condition, deforming the polyolefin to form a layer of polyolefin resin disposed generally about the core forming resin in the absence of fluid, deforming the heat-plastified materials into a stream, deforming the stream into a film-like configuration, passing the resultant composite heat-plastified stream into a cooling zone and lowering the temperature of the stream below the thermoplastic temperature thereof.

Advantageously such a film is readily heat-sealable under a wide variety of conditions to provide an attractive seal with high resistance to the passage of moisture vapor, oxygen and like gases.

The invention is further illustrated by the drawing wherein:

FIGURE 1 is an isometric representation of a package, in accordance with the invention.

FIGURE 2 is an alternate embodiment of a package, in accordance with the invention.

In FIGURE 1, there is illustrated a package generally designated by the reference numeral 10. The package 10 comprises a first panel 11, a layered synthetic resinous film having a barrier layer of a halogenated hydrocarbon resin disposed between two layers of a polyolefin resin such as polyethylene or polypropylene. The panel 11 has a first face 12 and a second face 13. A tear strip 15 is adhered to the face 13 and partially deforms the adjacent region of the panel 11. A second similar tear strip 17 is remotely disposed and in generally parallel relationship to the first tear strip 15. A second panel 18 is disposed adjacent to the panel 11, having a pressure sensitive adhesive element 19 thereon, and is joined thereto by means of a first edge seal 20 and a second edge seal 22. A plurality of lateral seals 24 and terminal seals 24a, in generally parallel spaced relationship extending from the edge seals 20 and 22, define a plurality of pockets or spaces 26 which are hermetically sealed. An elongate object, or cigar, 28 is disposed within each of the spaces 26. Each of the seals 24 defines a plurality of perforations 29.

The package 10 of FIGURE 1 is readily fabricated by a variety of methods. One such method is to prepare a panel, such as the panel 11, in strip form and adhere a tear strip to one face, such as the face 13, by means of disposing a strandular material along the surface, sealing or otherwise adhering the strip in the desired location, positioning the panel 12, forming the seals 24 laterally, extending across a length of film from which the package is being prepared, inserting the elongate objects such as the cigars into each space such as the space 26 between adjacent seals 24 and then forming the terminal seals 20 and 22.

Alternately, the two panels may be placed in face to face engagement, the seals 22 and 24 prepared and the elongate objects positioned within the compartments and subsequently the seal 20 formed.

In FIGURE 2 there is illustrated a view of an alternate package, in accordance with the present invention, generally designated by the reference numeral 35. The package 35 comprises a first or front panel 36 and a second or rear panel 38 or a layer synthetic resinous film having a barrier layer, a halogenated hydrocarbon resin disposed between two layers of a polyolefin resin. The panels 36 and 38 are adhered to each other by a first edge seal 39 and a second edge seal 40. A plurality of lateral or transverse seals 42 joined the panel 36 and 39 to form a plurality of separate hermetically sealed pockets or compartments 44. Each of the pockets 44 contains an elongate object or cigar 46. A tear strip 47 substantially similar to that of FIGURE 1 is disposed longitudinally on each of the pockets 44 in the panel 36. Beneficially a plurality of perforations 49 are provided in each of the seals 42 to permit readily separation of the individual compartments from each other.

The embodiment of FIGURE 2 is prepared in a manner generally similar to that employed in the fabrication of the package 10 of FIGURE 1. The embodiment of FIGURE 2 has the advantage of a longitudinally disposed tear strip which permits the entire compartment, or pocket 44, to be opened for the removal of the contents. However, the embodiment of FIGURE 1 offers economy of fabrication. Generally the sealing can be accompanied using conventional hot jaw heat sealers, impulse sealers, hot roll sealers and ultrasonic sealers, wherein a stylus vibrating at ultrasonic frequencies press the film together to cause bonding thereto. Beneficially the tear strip is incorporated in the panel prior to sealing the portion of the second panel. A satisfactory and beneficial tear strip can be provided by various well known means including the provision of a strand such as a thread which is partly imbedded within the face of the panel, which is to be disposed adjacent the second panel by means of heat sealing or the like, and, subsequently, heat sealing adjacent the thread. Gentle tension on the thread causes it to cut through the film and from an opening of the compartment in the desired location.

By way of further illustration, cigars are packaged, in accordance with FIGURE 1, utilizing a film consisting of an outer layer of low density polyethylene having a thickness of 1.53 mils, an intermediate or glue layer of a copolymer of 72 weight percent ethylene and 28 weight percent vinyl acetate having a thickness of 0.1, a central or barrier layer of 0.2 mil in thickness of 93.75 parts by weight of a copolymer of 85 weight percent vinylidene chloride and 15 weight percent vinylidene chloride, 4.5 parts by weight acetyl tributylcitrate, 1 part by weight of an epoxidized soyabean oil commercially available under the trade designation Paraplex G–60, 0.75 part by weight of 4-tertiarybutylsalol, a similar 0.1 mil thick layer of ethylene-vinyl acetate copolymer and a 1.53 mil layer of polyethylene to provide a coherent five-layer film. The package is prepared by heat sealing and cotton thread employed as the tear strip. The resultant package is flexible, and has a desirable and pleasant hand. Extensive storage, of cigars within the package, indicate excellent moisture retention within the package.

A similar package is prepared employing the arrangement illustrated in FIGURE 2. Similar, beneficial and advantageous results are achieved, however, the individual cigars are somewhat more easily removed than from the package prepared, in accordance with the configuration of FIGURE 1. Similar, beneficial and advantageous packages are prepared using varying thickness of polyethylene or polypropylene in combination of a barrier core such as Saran or vinylidene chloride copolymers as hereinbefore described. Such packages are convenient and provide excellent protection for articles such as cigars packaged therein.

As is apparent, from the foregoing specification, the present invention is susceptible of being embodied with various alterations and modifications which may differ, particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An improved package for elongate objects comprising a first panel and a second panel of a synthetic resinous material, the first panel and the second panel being bonded together in face to face arrangement at selected portions to provide a plurality of hermetically sealed compartments, each compartment containing an elongate object disposed within at least one of the hermetically sealed compartments, the first and second panels being of a layer construction and having an inner layer of a halogenated plastic and outer layers of resinous polyolefin.

2. The package of claim 1, wherein the first panel and second panel are joined together by means of plurality of heat seals and a tear strip in operative communication with at least one of the panels to selectively permit opening of the compartments, one at a time.

3. The package of claim 2, wherein each of the panels define a plurality of perforations by the adjacent compartments.

4. The package of claim 2, wherein each compartment has an individual tear strip.

5. The package of claim 2, wherein a cigar is disposed within each compartment.

6. The package of claim 1, wherein each panel comprises at least three layers, the outer layers being polyethylene and an inner layer being a resinous polymer containing a major portion of vinylidene chloride.

7. The package of claim 1, wherein the plurality of hermetically sealed compartments are in substantially parallel relationship to each other.

8. A package having elongate objects comprising a first panel and a second panel, the first panel and the second panel having generally commensurate dimensions and first and second edges, a first panel and a second panel being disposed in face to face arrangement, the first edge of the first panel being sealed to the first edge of the second panel, the second edge of the first panel to the second edge of the second panel, the first panel and the second panel being sealed together by a plurality of transverse seals extending from the first edge to the second edge of the first and second panels thereby forming a plurality of hermetically sealed adjacent substantially parallel elongate compartments, each compartment having an elongate object disposed therein, and a tear strip included in at least one of the panels adapted to provide access to each of the compartments.

9. The package of claim 8, wherein each compartment has a cigar disposed therein.

10. A package of claim 9, wherein a tear strip is disposed in each of the compartments and extends generally parallel to the transverse seals.

11. A method of packaging elongate objects which comprises enclosing a plurality of elongate objects within a synthetic resinous thermoplastic material in a form of film or sheet, wherein each elongate object is disposed within a separate compartment formed by sealing the film or sheet to a like film or sheet, wherein the film or sheet has an inner layer of halogenated hydrocarbon resin and outer layers of a polyolefin resin, the inner and outer layer adhered together.

12. A method for the packaging of cigars comprising the step of encapsulating a plurality of cigars in generally parallel relationship in a plurality of individual compartments formed from sheets of flexible synthetic resinous thermoplastic material, each of the compartments being affixed to at least one adjacent compartment disposing a tear strip within at least a portion of each compartment.

13. The method of claim 11, wherein the flexible synthetic thermoplastic resinous material is a film having an inner layer of a polymer of vinylidene chloride and the outer layer of polyethylene.

References Cited
UNITED STATES PATENTS

| | | | |
|---|---|---|---|
| 3,160,273 | 12/1964 | Reuther et al. | 206—56 |
| 3,165,249 | 1/1965 | Peck | 206—56 |
| 3,178,065 | 4/1965 | Auerswald | 206—84 |

THERON E. CONDON, *Primary Examiner.*

JAMES B. MARBERT, *Examiner.*